Patented July 30, 1929.

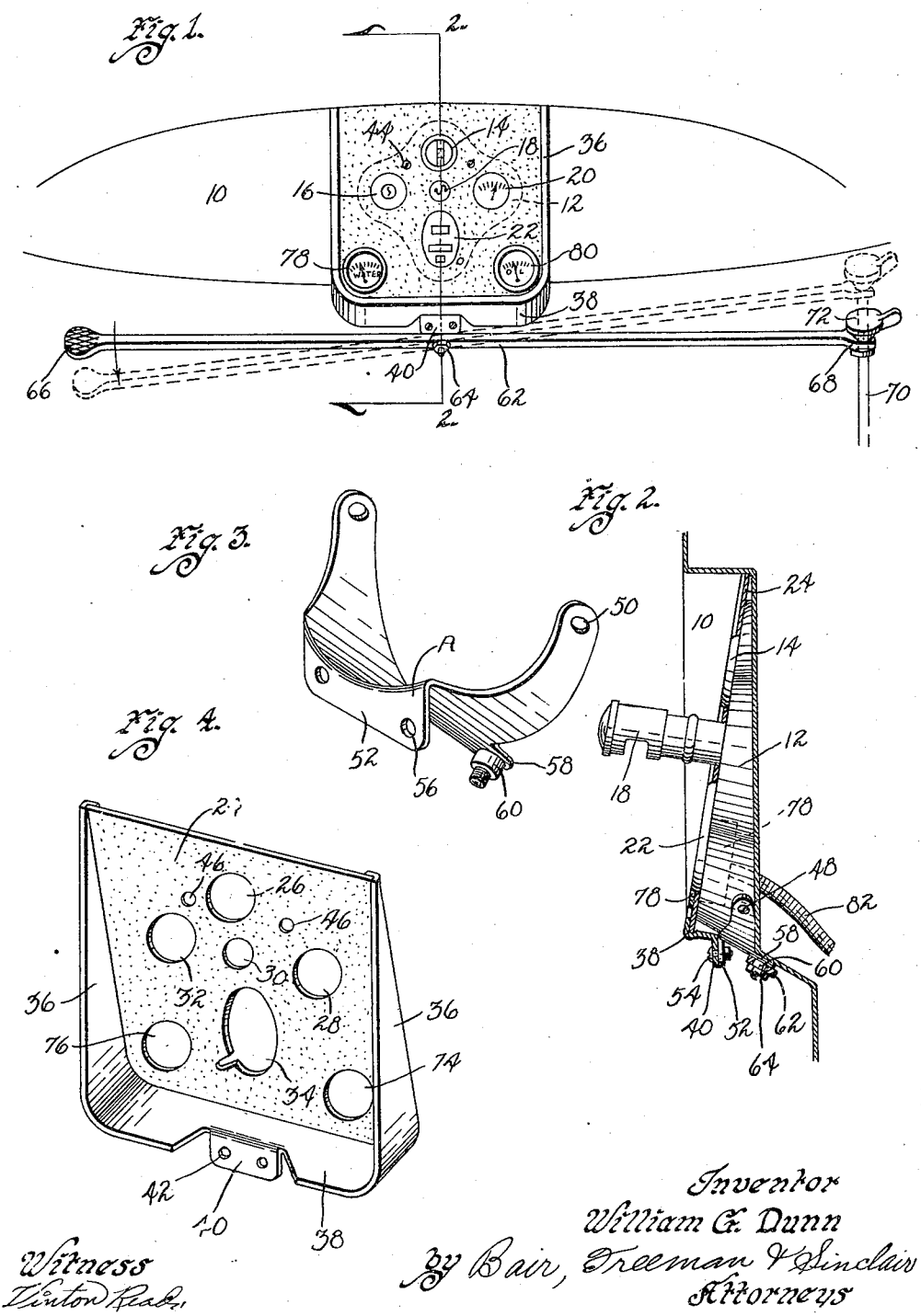

1,722,565

UNITED STATES PATENT OFFICE.

WILLIAM G. DUNN, OF CLARINDA, IOWA.

ATTACHMENT FOR INSTRUMENT BOARDS.

Application filed August 15, 1928. Serial No. 299,723.

The object of my invention is to provide an attachment for instrument boards of simple, durable and inexpensive construction.

A further object of my invention is to provide an attachment for instrument boards consisting of a mask to be positioned over the instrument panel and of a size larger than the instrument panel, so that additional instruments may be supported by the mask.

Still a further object is to provide in connection with the instrument board of an automobile a bracket to which the mask is secured.

Still a further object is to provide on the bracket a pivoted lever having a forked end adapted to engage under a choker button, whereby downward pressure on the other end of the lever will cause an upward pull on the choker button for the purpose of priming the engine of the automobile.

With these and other objects in view, my invention consists in the construction, arrangement and combination of the various parts of my attachment for instrument boards, whereby the objects contemplated are attained, as hereinafter more fully set forth, pointed out in my claims, and illustrated in the accompanying drawings, in which:

Figure 1 is a rear elevation of an instrument board illustrating my attachment secured thereto as viewed from the driver's seat in an automobile.

Figure 2 is an enlarged, sectional view taken on the line 2—2 of Figure 1.

Figure 3 is a perspective view of a bracket used in connection with my attachment; and Figure 4 is a perspective view of a mask for covering the instrument panel.

In the accompanying drawings, I have used the reference numeral 10 to indicate the instrument board of an automobile. The instrument board 10 is usually arranged in a substantially vertical position, and on the type of instrument board disclosed in my drawing, an instrument panel 12 is positioned.

The rear surface of the instrument panel 12 is raised from the surface of the instrument board 10, as clearly shown in Figure 2 of the drawings.

Various instruments, such as a gasoline gauge 14, ignition switch and lock 16, instrument panel light 18, ammeter 20, and speedometer 22 are mounted on the instrument panel 12.

My attachment consists of a mask 24, having openings 26, 28, 30, 32 and 34 for the instruments 14, 16, 18, 20 and 22 respectively to extend through.

The instruments are usually provided with a rim extending up above the surface of the instrument panel 12, and the openings in the mask 24 are designed to have such rims fit through them.

The instrument panel light 18, of course, is mounted on a post, which extends through the opening 30.

The mask 24 is supported by a frame consisting of side members 36 and a bottom member 38. The side members 36 fit against the instrument board 10 and the bottom member 38 fits up against the bottom of the instrument panel 12. A downwardly extending lip 40 is formed on the bottom member 38 and is provided with openings 42.

The outline of the instrument panel 12 is illustrated in dotted lines in Figure 1 of the drawings, and is provided with a pair of screws 44, which I utilize for the purpose of attaching the upper portion of the mask 24 to the instrument panel. Openings 46 are provided through which the screws 44 may extend.

The bottom of the instrument panel 12 is provided on each side with a screw 48 and by means of these screws, I attach a bracket A to the instrument panel.

The bracket A is substantially U-shaped to fit the lower curved portion of the panel 12 and is provided with openings 50 through which the screws 48 may extend. A downwardly extending lip 52 is provided on the bracket A to which the lip 40 of the instrument mask may be secured by means of bolts 54.

Openings 56 are provided in the lip 52 to receive the bolts 54.

A forwardly and downwardly extending lip 58 is provided on the bracket A, to which is secured a shoulder stud 60. A lever 62 is pivoted on the enlarged portion of the stud 60 and held in position with respect thereto by a nut 64.

One end of the lever 62 is formed into an enlarged flat head 66 adapted to be engaged by the operator of the automobile when he desires to choke the carburetor upon starting the engine.

The opposite end of the lever 62 is fork-like as indicated at 68 partly in dotted lines for straddling the choker rod 70 and engaging under the choker button 72.

The choker button 72 is mounted at the right-hand side of the instrument board 10 and therefore is difficult to reach from the driver's seat on the left side of the automobile.

The lever 62 greatly facilitates the choking of the carburetor as the head 66 is located beneath the steering wheel, where it is easy to get at by the driver of the automobile.

The instrument mask 24 is provided with openings 74 and 76 outside the outline of the instrument panel 12 as clearly shown in Figure 1. The openings 74 and 76 are adapted to receive a motometer gauge 78 indicating the temperature of the cooling medium, and an oil pressure gauge 80 adapted to register the pressure of the oiling system. The gauges 78 and 80 may be of standard make, and the openings 74 and 76 of the proper size for receiving them.

Since the lower part of the instrument panel 12 is thicker than the upper part thereof, sufficient room is available between the instrument mask 24 and the instrument board 10 for positioning the bodies of the gauges 78 and 80 as clearly shown in dotted lines in Figure 2 of the drawings. Each gauge 78 and 80 is provided with a control tube 82, which may extend through the instrument board 10 or underneath it as desired. The tubes 82 on the gauges 78 and 80 communicate with the radiator and the oiling system respectively.

From the foregoing description, it will be obvious that I have provided a neat appearing mask for the instrument panel, which allows for the mounting of additional instruments desirable in connection with the automobile.

The bracket A and the lever 62 provide in connection with the mask, an attachment for the additional instruments and for conveniently operating the choker rod 70 by pressing down on the head 66 as indicated in dotted lines in Figure 1.

Changes may be made in the arrangement and construction of the various parts of my attachment without departing from the real spirit and purpose of my invention, and it is my intention to cover by my claims, any modified forms of structure or use of mechanical equivalents, which may be reasonably included within their scope.

I claim as my invention:

1. In combination with a raised instrument board having an instrument panel thereon provided with a peripheral wall extending from the face of said instrument panel to the face of said instrument board, an attachment of the character disclosed comprising a mask to fit over the instrument panel, said mask being secured to the face of said bracket and to the peripheral wall of said raised panel.

2. In combination with an instrument board having a raised instrument panel thereon, an attachment of the character disclosed comprising a mask fitting against the face of said panel and being larger than the outline thereof whereby the portion of the mask outside of the outline of said panel is raised from the instrument board, and an instrument mounted on said raised portion.

3. In combination with an instrument board having a raised instrument panel thereon, an attachment of the character disclosed comprising a mask fitting against the face of said raised panel and being larger than the outline thereof whereby the portion of the mask outside of such outline is raised from said instrument board and an instrument mounted on such raised portion, the body of said instrument extending into the space between such portion and the instrument board.

4. In combination with an instrument board having a raised instrument panel thereon, the face of which is inclined relative to the face of said instrument board, an attachment of the character disclosed comprising a mask fitting against the face of said raised panel and being larger than the outline thereof whereby the portion of the mask outside of such outline is raised from said instrument board and arranged at an incline relative thereto, and an instrument mounted on such raised portion adjacent the high end thereof caused by such inclination.

5. In combination with an instrument board having a raised instrument panel thereon, an attachment of the character disclosed comprising a mask fitting against the face of said panel and being larger than the outline thereof whereby the portion of the mask outside of the outline of said panel is raised from the instrument board, walls at the edges of said mask, said walls extending from such edges to the instrument board, and an instrument mounted on said raised portion, the body of said instrument projecting into the space between said mask and said instrument board and hidden from view by said walls.

6. In combination with an instrument board having a raised instrument panel thereon, the face of which is inclined relative to the face of said instrument board, an attachment of the character disclosed comprising a mask fitting against the face of said raised panel and being larger than the outline thereof whereby the portion of the mask outside of such outline is raised from said instrument board and arranged at an incline relative thereto, and an instrument mounted on such raised portion adjacent the highest end thereof caused by such inclination, the body of said instrument extending into the space between such portion and the instrument board, walls extending from the edges of said mask to the face of said instrument board and contacting therewith, said walls serving to hide said body of said instrument from view.

Des Moines, Iowa, August 2, 1928.

WILLIAM G. DUNN.